Figure 1:
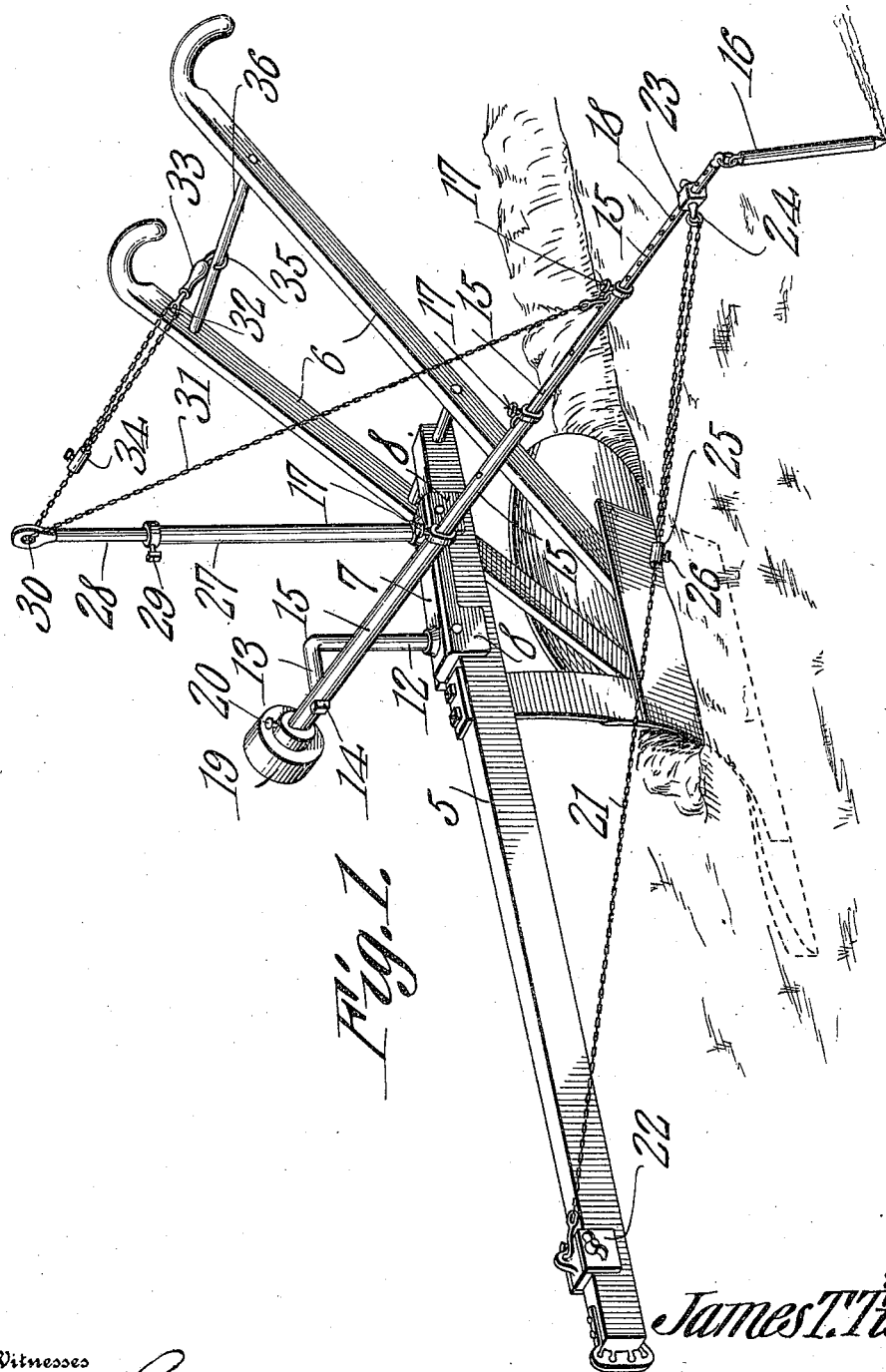

J. T. TUCKER.
MARKING ATTACHMENT FOR PLOWS.
APPLICATION FILED DEC. 1, 1909.

960,444.

Patented June 7, 1910.
2 SHEETS—SHEET 1.

Witnesses

Inventor
James T. Tucker.
By C. A. Snow & Co.
Attorneys

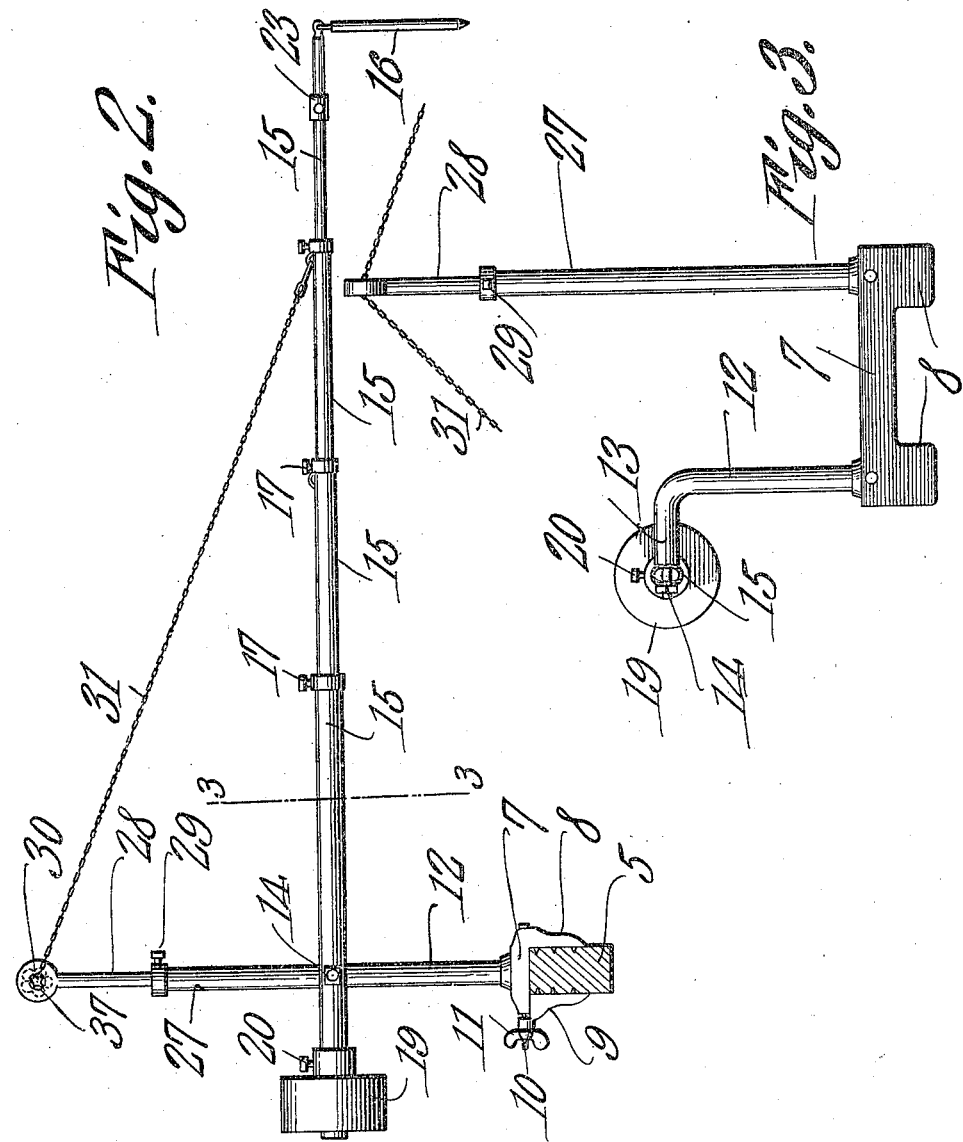

UNITED STATES PATENT OFFICE.

JAMES THOMAS TUCKER, OF MOULTRIE, GEORGIA.

MARKING ATTACHMENT FOR PLOWS.

960,444.  Specification of Letters Patent.  Patented June 7, 1910.

Application filed December 1, 1909. Serial No. 530,789.

*To all whom it may concern:*

Be it known that I, JAMES THOMAS TUCKER, a citizen of the United States, residing at Moultrie, in the county of Colquitt and State of Georgia, have invented a new and useful Marking Attachment for Plows, of which the following is a specification.

This invention relates to a device used in connection with plows for gaging and marking off the distance between the rows.

It is the object of the invention to provide a device of the kind stated which is strong and durable, and simple in construction, and also one which can be readily applied to, or removed from the plow, and which is adjustable to mark rows of different widths.

The invention also has for its object to provide a marking device which may be adjusted to operate on either side of the plow, together with novel means whereby it may be readily thrown from one side of the plow over to the other side, without the plowman leaving his position at the handles of the plow.

Another object of the invention is to provide means for balancing the marking device whereby it is prevented from pulling the plow to one side.

The invention also has for its object to provide a marking device embodying certain novel features of construction to be hereinafter described and claimed.

In the accompanying drawing forming a part of this specification, Figure 1 is a perspective view of a plow, showing the marking device in position thereon. Fig. 2 is the front end view of the marking device, the plow beam being shown in transverse section. Fig. 3 is a side elevation partly in section, the section being taken on the line 3—3 of Fig. 2.

Referring to the drawings, 5 denotes the beam of an ordinary plow to which the invention is applied. On the rear end of the plow beam, adjacent to the handles 6, is mounted a base plate 7 which carries the parts constituting the marking device. This base plate is formed with fixed jaws 8 fitting one side of the plow beam, and the other side of the plow beam is engaged by movable jaws 9 adjustably connected to the base plate, whereby a clamp is had for securing the base plate on the plow beam. The jaws 9 are mounted on screw stems 10 carried by the base plate, and by means of wing nuts 11 are held tightly locked against the side of the plow beam. From the front end of the base plate 7 rises a standard 12 having at its upper end a forward bend 13 extending parallel to the plow beam 5. To the extremity of this bend is pivoted, as indicated at 14, a gage comprising a series of telescoping rods 15, the last one of said rods carrying a trailing marking stem 16. The gage extends transversely of the plow beam 5, and may be lengthened or shortened so as to bring the stem 16 into position to mark a row of the desired width. The gage sections 15 are held at adjustment by set screws 17 carried at the outer ends of all the sections except the last one, and adapted to be screwed against the sections which telescope within the respective sections. The gage section to which the marking stem 16 is connected has inch graduations 18, so that the stem 16 may be accurately set.

On the end of the gage opposite the end which carries the stem 16, is adjustably mounted a counterweight 19, which is held at adjustment by a set screw 20. The function of this weight is to balance the gage, and take its weight off one side, which would tend to pull the plow over to that side. The gage is provided with a brace 21 which is a chain connected at one end by means of a clamp 22 to the front end of the plow beam 5, the other end of the chain being connected to a clamp 23 mounted on that section of the gage to which the stem 16 is connected. The chain is looped through a ring 24 carried by the clamp 23, and is connected to a sleeve 25, which is slidably mounted on the main portion of the chain, and is held at adjustment thereon by a set screw 26. The function of this sleeve is to permit lengthening and shortening of the chain.

The means for swinging the gage from one side of the plow over to the other comprises the following instrumentalities: From the rear end of the base plate 7 rises a standard 27 which is tubular and receives a telescoping stem 28, held at adjustment by a set screw 29. The upper end of the stem 28 is formed with an eye 30 through which passes a chain 31 connected at one end to one of the sections 15 of the gage, preferably, the next to the last one. The other end of the chain is looped around a small pulley or roller 32 carried by a hand grip 33, and said end of the chain is connected to an adjusting sleeve 34 similar to the sleeve 25 already described, and provided for the same purpose. The hand grip 33 has a hook 35 which is adapted to be placed over one of the cross bars 36 connecting the plow handles 6. Within the eye 30 are mounted antifriction rollers 37, so that the chain 31 may slip easily therethrough.

The gage and the stem carried thereby are swung from one side of the plow over to the other, by releasing the hand grip 33 from the cross bar 36, and giving the chain 31 a pull. The stem 16 is loosely connected to the rod 15 so that it will automatically swing into marking position when the gage is swung over to the other side of the plow.

In use, the device is mounted on the plow beam, near its rear end, as herein described, and clearly shown in Fig. 1. The gage is adjusted according to the distance desired between the rows, and is swung over to one side of the plow, so that the marking stem may trail over the ground, in which position it is held by the chains 21 and 31. Fig. 1 shows the marking stem on the land side of the plow, and the stem therefore makes a mark for the next furrow. If desired, the gage may be swung over to the other side of the plow so that the stem trails in the last furrow made. In either case, the rows will be accurately spaced apart. The necessary adjustments can be quickly and easily made, and the gage can be swung from one side of the plow to the other without the plowman leaving his place at the handles. The gage sections 15 are oblong in cross sections so that they cannot turn one within the other, and they are securely held in adjusted position by the set screws 17. The plow runs as easy with the attachment as without, as the weight 19 serves to balance the parts. At the end of the row, when starting back in the opposite direction, a pull on the chain 31 brings the gage and the marking stem over on the other side of the plow beam, and the device is ready to mark off the next row.

The marking device is herein described and shown applied to a plow, but it will be evident that it may also be connected to a cultivator.

What is claimed is:

1. In a marking attachment for plows, the combination with a plow beam, of a marker, a support for said marker comprising adjustable sections whereby said support may be lengthened and shortened, the marker being carried on one end of the support, and a counterweight adjustably mounted on the other end of the support.

2. In a marking attachment for plows, the combination with a plow beam, of a marker, a support for the marker carried by the plow beam, and pivoted to swing to either side thereof, a standard rising from the plow beam, and having an eye at its upper end, a hoisting line passing through said eye, and connected at one of its ends to the support of the marker, and holding means for the other end of hoisting line.

3. In a marking attachment for plows, the combination with a plow beam and its handles, the latter being connected by a cross bar, of a marker, a support for the marker carried by the plow beam, and pivoted to swing to either side of the beam, a standard rising from the plow beam, and having an eye, a hoisting line passing through said eye, and connected at one end to the support of the marker, and a hook carried by the other end of the line, and adapted to engage the aforesaid cross bar of the handles.

In testimony that I claim the foregoing as my own, I have hereto affixed my signature in the presence of two witnesses.

JAMES THOMAS TUCKER.

Witnesses:
G. W. HAMMOND,
W. H. PITCHFIELD.